(12) United States Patent
Brewer et al.

(10) Patent No.: US 7,660,792 B2
(45) Date of Patent: Feb. 9, 2010

(54) SYSTEM AND METHOD FOR SPAM IDENTIFICATION

(75) Inventors: Brett D. Brewer, Sammamish, WA (US); Eric B. Watson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 381 days.

(21) Appl. No.: 11/117,568

(22) Filed: Apr. 29, 2005

(65) Prior Publication Data

US 2006/0248072 A1 Nov. 2, 2006

(51) Int. Cl.
*G06F 17/30* (2006.01)
(52) U.S. Cl. .............................. 707/5; 707/10; 709/218
(58) Field of Classification Search ...................... 707/3, 707/4, 5, 10; 705/10; 709/218, 203, 204
See application file for complete search history.

(56) References Cited

U.S. PATENT DOCUMENTS

| | | | |
|---|---|---|---|
| 7,283,997 B1 * | 10/2007 | Howard et al. ................. 707/5 |
| 2002/0087526 A1 * | 7/2002 | Rao .............................. 707/3 |
| 2003/0220912 A1 * | 11/2003 | Fain et al. ....................... 707/3 |
| 2004/0039733 A1 * | 2/2004 | Soulanille ....................... 707/3 |
| 2005/0071741 A1 * | 3/2005 | Acharya et al. ............. 715/500 |
| 2005/0144067 A1 * | 6/2005 | Farahat et al. ................. 705/14 |
| 2005/0165745 A1 * | 7/2005 | Hagale et al. .................. 707/3 |
| 2006/0149606 A1 * | 7/2006 | Goan et al. ..................... 705/7 |
| 2006/0161524 A1 * | 7/2006 | Roy et al. ....................... 707/3 |
| 2006/0200445 A1 * | 9/2006 | Chen et al. ..................... 707/2 |

* cited by examiner

*Primary Examiner*—Hosain T Alam
*Assistant Examiner*—Amy Ng
(74) *Attorney, Agent, or Firm*—Shook Hardy & Bacon LLP (57) ABSTRACT

A system and method are provided for improving a user search experience by identifying spam results in a result set produced in response to a query. The system may include a user interface spam feedback mechanism for allowing a user to indicate that a given result is spam. The system may additionally include an automated spam identification mechanism for implementing automated techniques on the given result to determine whether the given result is spam. The system may further include a merging component for merging the determinations of the user interface spam feedback mechanism and the automated spam identification mechanism for deriving an indicator of the likelihood that a given result is spam.

18 Claims, 5 Drawing Sheets

SYSTEM AND METHOD FOR SPAM IDENTIFICATION

CROSS-REFERENCE TO RELATED APPLICATIONS

None.

STATEMENT REGARDING FEDERALLY SPONSORED RESEARCH OR DEVELOPMENT

None.

TECHNICAL FIELD

Embodiments of the present invention relate to a system and method for spam identification. More particularly, embodiments of the invention relate to facilitating user feedback to improve spam identification.

BACKGROUND OF THE INVENTION

Through the Internet and other networks, users have gained access to large amounts of information distributed over a large number of computers. In order to access the vast amounts of information, users typically implement a user browser to access a search engine. The search engine responds to an input user query by returning one or more sources of information available over the Internet or other network.

The search engine typically performs two functions including (1) finding matching results and (2) scoring the matching results to determine a display order. The search engines typically order or rank the results based on the similarity between the terms found in the accessed information sources to the terms input by the user. Results that show identical words and word order with the request input by the user are given a high rank and will be placed near the top of the list presented to the user.

Scoring performed by different search engines takes into account various factors including whether a match was found in the title, the importance of the match, the importance of a phrase match, and other factors determined by the search engine. Parameters that work well for one kind of search may not work well for all searches and parameters that work for some users may not work well for others.

Web site owners are constantly trying to manipulate search engines in order to artificially inflate their web site rankings for specific search terms. Highly monetizable terms such as "travel", "hotel", "Viagra", "dvd", etc., are spammed in order to drive traffic to the web site. The search engines may give these web sites a high ranking and never learn that the web sites are spam sites. This spamming technique can lead to an inferior user experience on average and distort the true value of a web site to the user.

The user base of searchers will generally be the best source for information pertaining to whether results are spam results. However, requests to end users to provide more feedback data have been met with limited success. The limited success stems from the fact that providing feedback is often cumbersome and time consuming for users. Furthermore, pre-configured feedback formats are often inadequate.

Additionally, in considering user feedback, a system must be able to identify feedback from spammers in order to prevent such feedback from artificially lowering rankings of competitors' websites.

User satisfaction is a critical success factor for a search engine. Spam results significantly decrease the quality of the user experience. Accordingly, a solution is needed that facilitates identification and filtering of spam results.

BRIEF SUMMARY OF THE INVENTION

Embodiments of the present invention include a method for improving a user search experience by identifying any spam results in a result set produced in response to a query. The method may include receiving user feedback indicating whether a given result is spam and implementing automated spam identification techniques on the given result. The method may additionally include merging data obtained from the user feedback and the automated spam identification techniques to obtain an indicator for the given result, the indicator providing a likelihood that the given result is spam.

In an additional aspect, a method is provided for improving a user search experience by identifying any spam results in a result set produced in response to a query. The method may include providing a user interface spam feedback mechanism for allowing a user to indicate that a given result is spam and implementing the received feedback to alter a future ranking of the given result based on the user feedback. The method may additionally include determining whether user feedback is spam feedback.

In yet an additional aspect, a system is provided for improving a user search experience by identifying spam results in a result set produced in response to a query. The system may include a user interface spam feedback mechanism for allowing a user to indicate that a given result is spam and an automated spam identification mechanism for implementing automated techniques on the given result to determine whether the given result is spam. The system may additionally include a merging component for merging the determinations of the user interface spam feedback mechanism and the automated spam identification mechanism for deriving an indicator of the likelihood that a given result is spam.

BRIEF DESCRIPTION OF THE DRAWINGS

The present invention is described in detail below with reference to the attached drawings figures, wherein.

DETAILED DESCRIPTION OF THE INVENTION

I. System Overview

Figure 1:
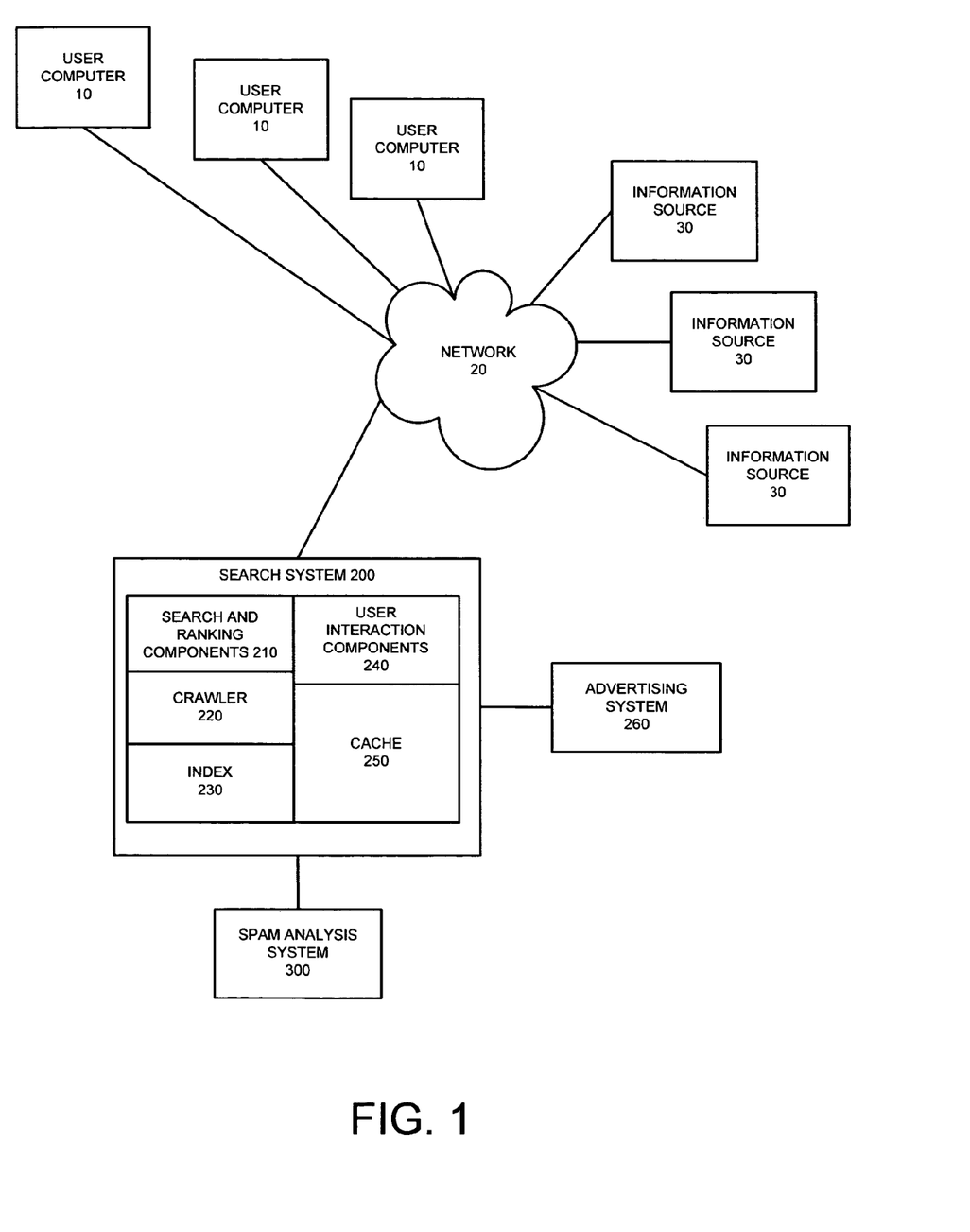
FIG. 1 is a block diagram illustrating an overview of a system in accordance with an embodiment of the invention.

A system and method are provided for identifying results produced by a search engine as spam. The system and method utilize a combination of automated spam identification techniques and user feedback to identify results as spam and adjust result rankings accordingly. As illustrated in FIG. 1, a plurality of user computers 10 may be connected over a network 20 with a search system 200. The search system 200 may respond to a user query by searching a plurality of information sources 30. The search system may also be connected with an advertising system 260 and a spam analysis system 300. The advertising system 260 may store information pertaining to advertiser bids on keywords and access stored advertisements. The spam analysis system 300 may utilize information from the advertising system 260 and the search system 200 to detect spam results.

The search system 200 may include search and ranking components 210, a crawler 220, an index 230, user interaction components 240, and a cache 250. In operation, the crawler 220 may traverse the information sources 30 and store results indexed by keyword in the index 230. The cache 250 may be used to store results that are frequently accessed in order to facilitate efficient operation of the search system 200. The search and ranking components 210 may locate and rank results based on an input query.

The user interaction components 240 may be provided to obtain user feedback pertaining to spam and deliver the feedback to the spam analysis system 300. The spam analysis system 300 may accumulate user feedback for subsequent use by the search system 200 for optimization of future search results.

Although the aforementioned components are variously shown as integrated with the search system 200, one or more of the components may exist as separate and discrete units or systems. The search engine 200 may include additional known components, omitted for simplicity.

As set forth above, optimizing search result ranking is challenging due to the difficulty inherent in accurately evaluating results. Embodiments of the invention, through the user feedback components 240 and the spam analysis system 300, provide a friendly interface and enable highly actionable user feedback to be gathered on a large scale from willing users. In embodiments of the invention, the user feedback components 240 enable users to provide feedback regarding what results are spam for their specific queries. Unfortunately, this technique also invites artificial inflation techniques. A spammer can use this mechanism to elect his or her spam site as a good site and a competitor's site as spam site. Accordingly, the spam analysis system 300 includes components for detecting false spam feedback.

Embodiments of the invention implement a user interaction UI mechanism such as a toolbar button or other UI element on a search results page to allow a user to send information back to the search system 200 identifying a particular result as spam for a particular query. The spam analysis system 300 aggregates input data for all user spam feedback and merges the data with the data coming from automated spam analysis module 400. If both pieces of data agree that the result is spam, the spam analysis system 300 may ensure that the result will be penalized in future rankings to prevent the artificial rank inflation of spam.

II. Exemplary Operating Environment

Figure 2:
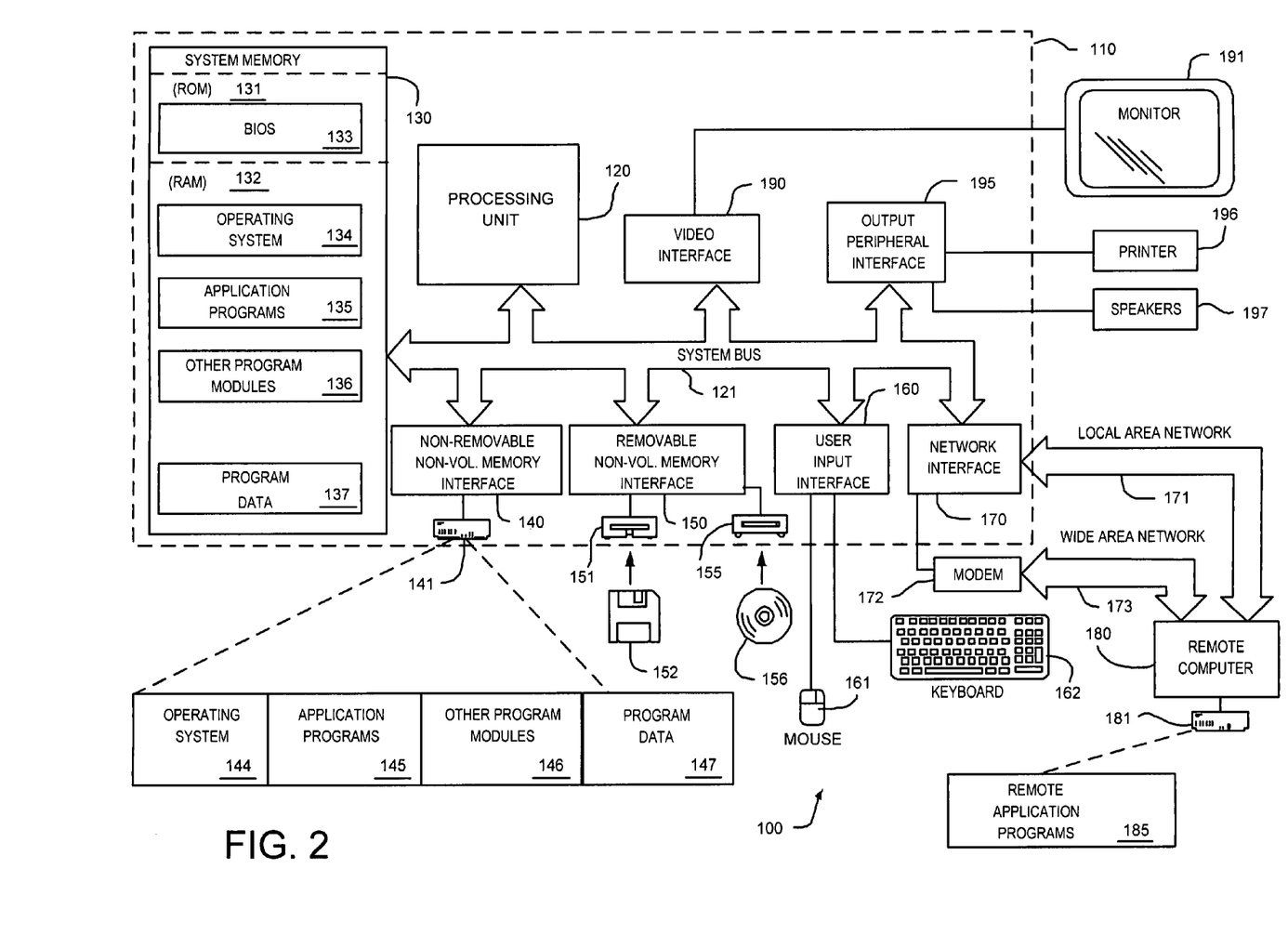
FIG. 2 is block diagram illustrating a computerized environment in which embodiments of the invention may be implemented.

FIG. 2 illustrates an example of a suitable computing system environment 100 on which the system for spam identification may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 2, the exemplary system 100 for implementing the invention includes a general purpose-computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

III. System and Method of the Invention

As set forth above, FIG. 1 illustrates a system for evaluating whether results produced by a search engine are spam results. The system and method utilize a combination of automated spam identification techniques and user feedback to identify results as spam and adjust result rankings accordingly. As illustrated in FIG. 1, user computers 10 may be connected over the network 20 with the search system 200. As described above with respect to FIG. 2, the network 20 may be one of any number of different types of networks such as the Internet.

The search system 200 may also be connected with the advertising system 260 and the spam analysis system 300. The advertising system 260 may store information pertaining to advertiser bids on keywords and access advertisements. The information may include keyword monetization values that are based on advertiser bids. The spam analysis system 300 may utilize information from the advertising system 260 and the search system 200 to identify and appropriately identify and address spam results.

The user interaction components 240 of the search system 200 may receive user input regarding spam results and deliver this input to the spam analysis system 300. In embodiments of the invention, the user interaction components 240 are implemented in a UI mechanism such as a toolbar button or UI element on the search results page. A user can send information back to the search system 200 identifying a particular result as spam for a particular query.

For example, each result on a search result page may include an adjacent "feedback" link. The user may click the feedback" link next to any result. A form may then open that permits the user to mark the result as spam for the query. In a further embodiment, the toolbar may be equipped with a button capable of marking any displayed result or a currently shown web page as spam. The user interaction components 240 are configured to provide a simple, non-intrusive technique for facilitating user feedback on spam. As will be further illustrated below, the technique further ensures that the system also recognizes and appropriately reacts to feedback from spammers.

Figure 3:
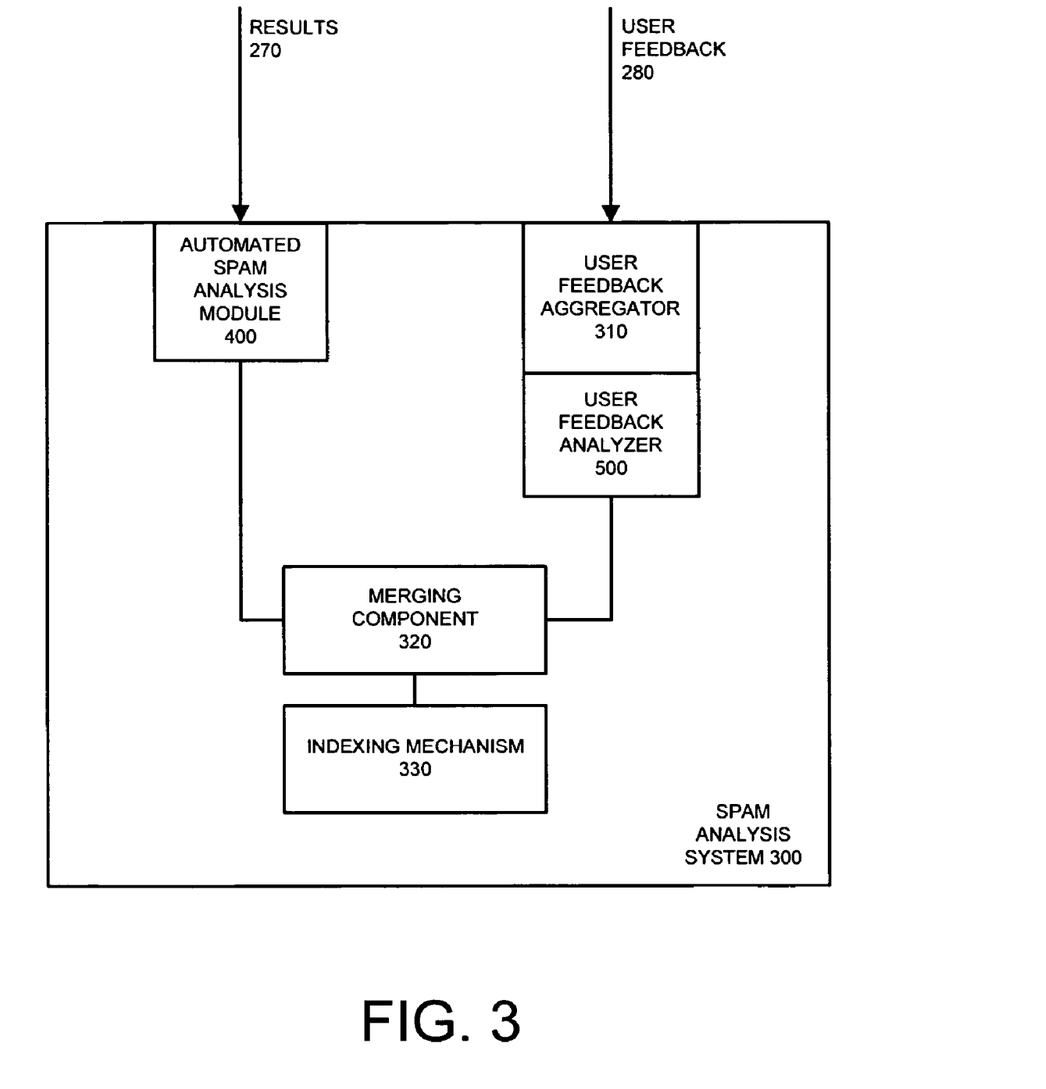
FIG. 3 is a block diagram illustrating components of a spam analysis system in accordance with an embodiment of the invention.

FIG. 3 is a block diagram illustrating an embodiment of the spam analysis system 300. The spam analysis system 300 may include a user feedback aggregator 310, a user feedback analyzer 500, an automated spam analysis module 400, a merging component 320, and an indexing mechanism 330. In operation, the spam analysis system 300 may obtain results 270 and user feedback 280 from the search system 200. The user feedback aggregator 310 aggregates feedback across multiple users and delivers it to the user feedback analyzer 500. The user feedback analyzer 500 includes algorithms for analyzing user feedback as will further explained below.

In addition to the user feedback, results produced by the search system 200 are delivered to the spam analysis system 300. The automated spam analysis module 400 analyzes the search results 270 for spam. The merging component 320 merges the determinations of the automated spam analysis module 400 and the user feedback analyzer 500 and generates an indicator of the likelihood that a given result is a spam result. Finally, the indexing mechanism 330 may index the result along with an indicator of whether the result is likely to be a spam result. The indexing mechanism 330 receives information from the merging component 320 that indicates whether the automated spam analysis module 400 and the user feedback analyzer 500 reached the same conclusion regarding whether a result is spam. If both sources agreed, the search and ranking components 210 may penalize this result in future results rankings based on the indexed spam indicator so as to not allow the artificial inflation of its rank in the future.

Figure 4:
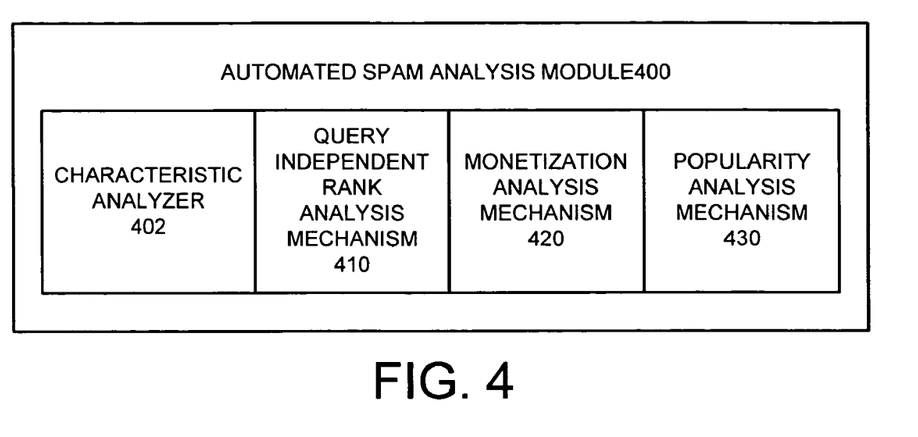
FIG. 4 is a block diagram illustrating an automated spam analysis module in accordance with an embodiment of the invention.

FIG. 4 is a block diagram illustrating an embodiment of the automated spam analysis module 400. The automated spam analysis module 400 may include a characteristic analyzer 402, a query independent rank analysis mechanism 410, a monetization analysis mechanism 420, and a popularity analysis mechanism 430. The characteristic analyzer 402 may examine features of a result such as how many advertisements are included on a website, whether keyword stuffing appears to occur within the referenced result, and whether the result appears to be a member of a group of results with the same IP address that tend to be spammer pages. Based on these characteristics, the characteristic analyzer 402 may determine whether a result is likely to be a spam result. The determination of the characteristic analyzer 402 may be used in combination with other automated determinations.

The query independent rank analysis mechanism 410 may consider the query independent rank of each result as determined by a known technique such as numbers of links to the result. The monetization analysis mechanism 420 may consider monetization value of query terms are based on monetization data from the advertising system 260 and on click-through rates on sponsored sites for the input query and bid rates for the query terms leading to the result. For example, if a query is non-commercial, such as "Carnegie Mellon University", the automated spam analysis module 400 might be less aggressive at finding spam. However, if a query is highly commercial, such as "hotel", advertisers may be bidding highly to have their advertisements shown. Accordingly, the automated spam analysis module 400 may be more aggressive about filtering out spam.

The popularity analysis mechanism 430 determines the popularity of the results produced by examining traffic to the website referenced by the result. The popularity analysis mechanism 430 may operate through the toolbar by capturing all of the URLs each user visits. If data collected from multiple user toolbars indicates that many users visit a particular result, then the automated spam analysis module 400 decreases the probability that the result is spam.

Figure 5:
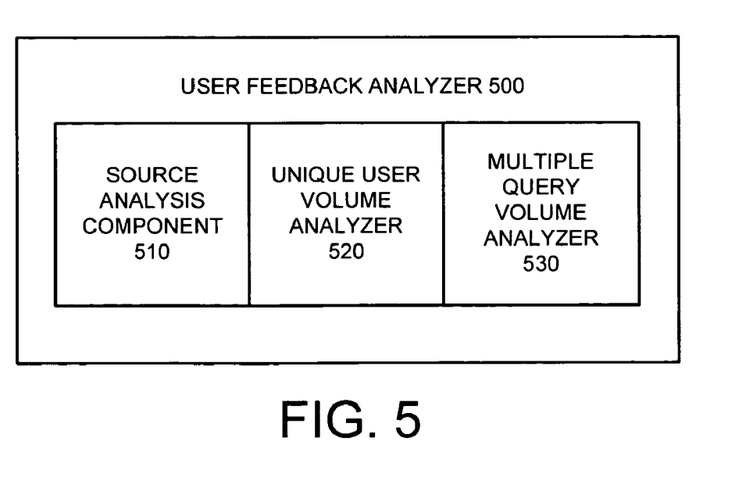
FIG. 5 is a block diagram illustrating a user feedback analyzer in accordance with an embodiment of the invention.

FIG. 5 illustrates an embodiment of the user feedback analyzer 500. The user feedback analyzer 500 may include a source analysis component 510, a unique user volume analyzer 520, and a multiple query volume analyzer 530.

The source analysis component 510 may determine the originating IP address of the user feedback. The unique user volume analyzer 520 may mark feedback as spam feedback if excessive feedback is originating with a single user. For example, the unique volume analyzer 520 may determine if all user feedback for a result is coming from one or very few IP address as determined by the source analysis component 510. The unique user volume analyzer 520 determines that this is likely a spammer trying to spam vote a result negatively.

The multiple query volume analyzer 530 determines whether a result is being marked as spam across multiple queries. If a result is marked as spam across multiple queries, this is a higher confidence measure that the result is spam and will not create a positive user experience regardless of the query. Accordingly, the user feedback analyzer 500 utilizes spam feedback volume across unique users and spam feedback volume across multiple queries to mark a result as spam. The capability of the system to detect and disregard spam voting ensures the data is accurate.

The combination of the determinations of the automated spam analysis module 400 and the user feedback analyzer 500 yields a reliable indication of whether or not a result ranking should be lowered because of the likelihood that the result may be spam. As set forth above, the determinations of the automated spam analysis module 400 and the user feedback analyzer 500 are merged by the merging component 320. The merging component 320 delivers its conclusion to the indexing mechanism 330. In situations in which the user fails to provide feedback, the data provided by the automated spam analysis module 400 can be utilized independently of any user feedback to filter out spam results. The merging component 320 may implement a spam scale and provide a number to the indexing mechanism 330, which will index the result along with the relevant number, so that the search and ranking component 210 of the search engine 200 can adjust the rank of the result accordingly when the result is produced in response to a user query. The number produced by the merging component 320 indicates the likelihood that a result is a spam result. The number derived and delivered by the merging component 350 may affect a future rank of a given result in all queries.

Figure 6:
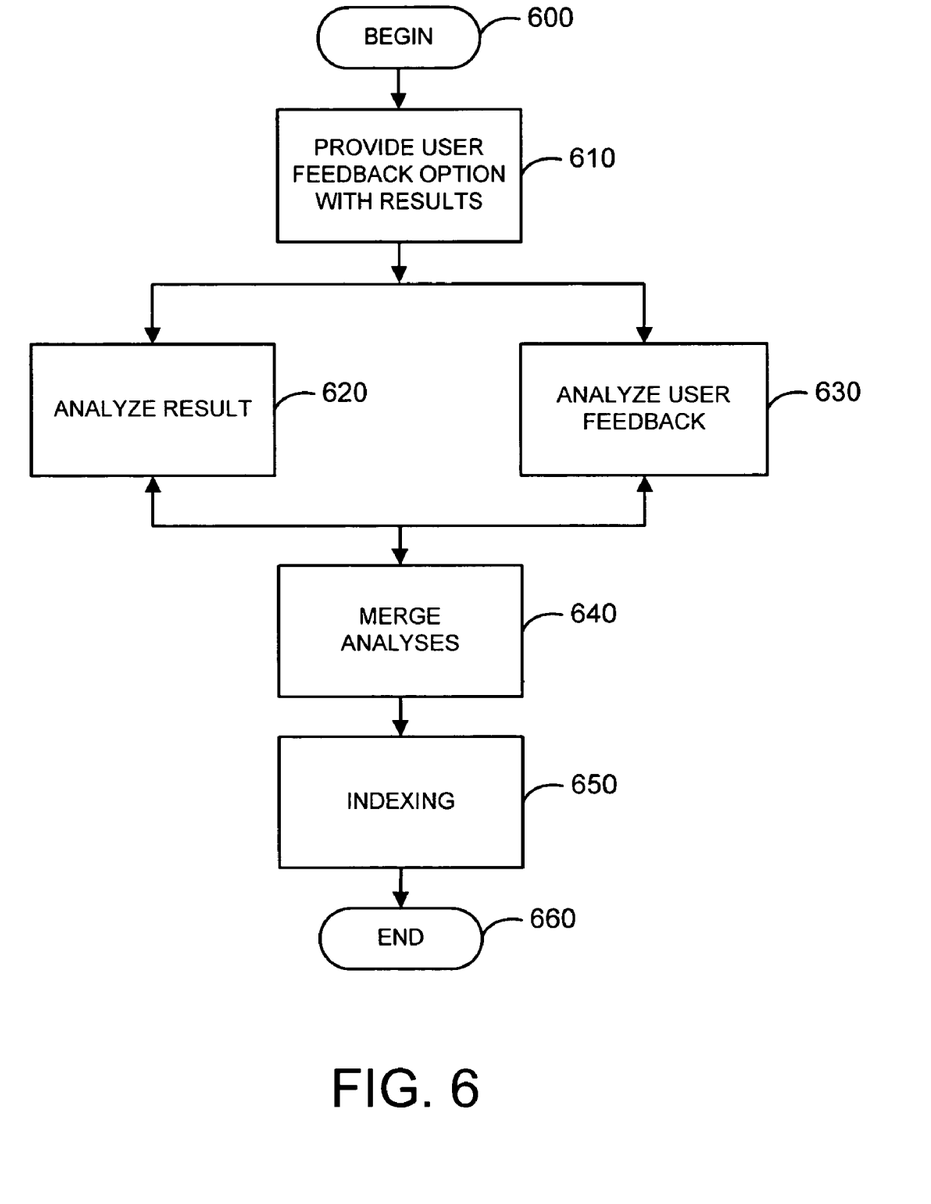
FIG. 6 is a flow chart illustrating a method for analyzing results in accordance with an embodiment of the invention.

FIG. 6 is a flow chart illustrating a method in accordance with an embodiment of the invention. The method begins in step 600 and the system provides results along with feedback options in step 610. In step 620, the results are processed by the automated spam analysis module 400. In step 630, the system receives and analyzes user feedback. In step 640, the merging component receives information from the automated spam analysis module 400 and the user feedback analyzer 500 and merges the user feedback analysis with the result analysis in order to produce a number or other indicator that provides a likelihood that the result is a spam result. If no user feedback is available, the merging component 320 will determine the indicator based on the automated determination. In step 650, indexing component 330 indexes the result along with the number delivered to the merging component 320. Ultimately, the search and ranking components 210 of the search engine 200 may adjust the rank of the result. In embodiments of the invention, the indexed number is a number between zero and one that indicates a spam probability and is used to determine a ranking penalty of a result. The method ends in step 660.

Embodiments of the invention implement a UI mechanism such as a toolbar button or other UI element on the search results page to allow a user to send information back to the search system, identifying a particular result as spam for a particular query. On the back end, this information is aggregated for all user spam feedback, and this data is merged with the data coming from automated spam identification techniques. If both pieces of data agree that the result is spam, this result will be penalized in future results rankings so as to not allow the artificial inflation of its rank in the future. Integrating user feedback data and automated spam techniques provides more reliable data for arriving at a spam determination for each result.

While particular embodiments of the invention have been illustrated and described in detail herein, it should be understood that various changes and modifications might be made to the invention without departing from the scope and intent of the invention. The embodiments described herein are intended in all respects to be illustrative rather than restrictive. Alternate embodiments will become apparent to those skilled in the art to which the present invention pertains without departing from its scope.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

What is claimed is:

1. A method for improving a user search experience by identifying spam results in a result set produced in response to a query, the method comprising:

receiving, at a computing device, user feedback identifying as spam an individual result within a plurality of search results presented to a user in response to a query entered by the user, wherein the user feedback is entered by selecting a link that is displayed contemporaneously with and adjacent to the individual result;

implementing one or more automated spam identification techniques on the individual result to determine whether the individual result is spam based on one or more characteristics of a website referenced by the individual result; and merging data obtained from the user feedback and the one or more automated spam identification techniques to obtain an indicator for the individual result, the indicator providing a likelihood that the individual result is spam, wherein the one or more automated spam identification techniques include determining a keyword monetization value for the query, wherein when the individual result is returned in response to a specific query with a low keyword monetization value the individual result is less likely to be spam.

2. The method of claim 1, further comprising analyzing user feedback received through the user interface to determine if the user feedback is spam, wherein the user feedback is designated as spam if above a threshold amount of the user feedback is originating from less than a threshold amount of IP addresses.

3. The method of claim 1, wherein the one or more automated spam identification techniques comprise determining whether keyword stuffing is present on the website referenced by the individual result.

4. The method of claim 1, further comprising analyzing the user feedback for the individual result across multiple queries, wherein a confidence that the individual result is spam is increased when the user feedback is received in connection with presenting the individual result in response to the multiple queries.

5. The method of claim 1, wherein the one or more automated spam identification techniques comprise determining a query independent rank of the individual result.

6. The method of claim 1, wherein the one or more automated spam identification techniques comprise a popularity analysis that determines a popularity of the individual result by examining traffic to a website referenced by the individual result, wherein a high popularity indicates a lower probability that the individual result is spam.

7. The method of claim 1, further comprising storing the individual result and the indicator in an index in order so that a ranking mechanism accesses the indicator when the given result is produced in response to any future query.

8. The method of claim 1, further comprising determining that the individual result is spam if the one or more automated spam identification techniques for the individual result and the user input agree that the individual result is spam.

9. A method for improving a user search experience by identifying spam results in a result set produced in response to a query, the method comprising:

receiving, at a computing device, a search query;

providing a set of search results;

providing a user interface spam feedback mechanism for allowing a user to explicitly designate an individual result within the set of search results as spam, wherein the spam feedback mechanism is displayed contemporaneously with the set of search results;

receiving user feedback designating the individual result as spam;

determining whether the user feedback is spam feedback;

implementing one or more automated spam identification techniques on the individual result to determine whether the individual result is spam; and merging data obtained from the user feedback and the one or more automated spam identification techniques to obtain an indicator for the individual result, the indicator providing a likelihood that the individual result is spam, wherein the one or more automated spam identification techniques include determining a keyword monetization value for the query, wherein when the individual result is returned in response to a specific query with a low keyword monetization value the individual result is less likely to be spam.

10. The method of claim 9, wherein the spam feedback is disregarded when altering the future ranking.

11. The method of claim 9, wherein determining whether user feedback is spam comprises determining a source of the feedback and determining whether the feedback originates with unique users.

12. The method of claim 9, further comprising analyzing the user feedback for the individual result across multiple queries, wherein a confidence that the individual result is spam is increased when user feedback indicating the individual result is spam is received in connection with presenting the individual result in response to the multiple queries.

13. The method of claim 9, further comprising determining that the individual result is spam if the one or more automated spam identification techniques for the individual result and the user input agree that the individual result is spam.

14. The method of claim 9, wherein the one or more automated spam identification techniques comprise determining a query independent rank of the individual result.

15. The method of claim 9, wherein the one or more automated spam identification techniques comprise a popularity analysis that determines a popularity of the individual result by examining traffic to a website referenced by the individual result, wherein a high popularity indicates a lower probability that the individual result is spam.

16. The method of claim 9, further comprising storing the individual result and the spam indicator in an index in order so that a ranking mechanism accesses the indicator when the individual result is produced in response to any future query.

17. One or more computer storage media storing computer-executable instructions embodied thereon for performing a method of identifying spam search results, the method comprising:

receiving, at a computing device, user feedback from one or more users who enter the user feedback into a user interface that is displayed designate one or more search results as spam;

determining whether the user feedback is spam;

aggregating the user feedback for each of the one or more search results into a feedback analysis;

implementing one or more automated spam identification techniques on each of the one or more search results to generate an automated analysis that determines whether each search result is spam; and merging the feedback analysis and the automated analysis for each of the one or more search results to generate an indicator for each of the one or more search results, wherein the indicator indicates a likelihood that the search result is spam, wherein the one or more automated spam identification techniques include determining a keyword monetization value for the query, wherein when the individual result is returned in response to a specific query with a low keyword monetization value the individual result is less likely to be spam.

18. The one or more media of claim 17, wherein the user feedback is designated as spam if above a threshold amount of the user feedback originated from less than a threshold amount of IP addresses.

* * * * *

UNITED STATES PATENT AND TRADEMARK OFFICE
CERTIFICATE OF CORRECTION

PATENT NO. : 7,660,792 B2
APPLICATION NO. : 11/117568
DATED : February 9, 2010
INVENTOR(S) : Brewer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 472 days.

Signed and Sealed this

Thirtieth Day of November, 2010

David J. Kappos
*Director of the United States Patent and Trademark Office*